3,556,764
METHOD OF INCREASING THE SUGAR CONTENT OF SUGARCANE
Philip C. Hamm, Glendale, Mo., assignor to Monsanto Company, St. Louis, Mo., a corporation of Delaware
No Drawing. Filed Mar. 28, 1969, Ser. No. 811,630
Int. Cl. A01n 9/14
U.S. Cl. 71—103                                   1 Claim

ABSTRACT OF THE DISCLOSURE

Increasing the sugar content of sugarcane by contacting the sugarcane with 2-isopropylidineaminoethanol salt of p-nitrobenzenesulfonylisourea.

---

In accordance with this invention, the sugar content of sugarcane is increased by a method which comprises applying to maturing sugarcane 2-isopropylidineaminoethanol salt of p-nitrobenzenesulfonylisourea having the formula

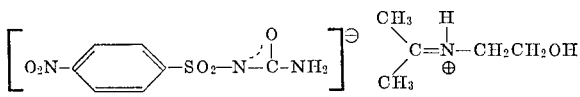

This formula represents the resonance hybrid for the anionic portion and will be used for convenience in the specification and claim. The term "isourea" will also be used in the specification and claim.

The compound is applied to the maturing sugarcane prior to the time the sugarcane has reached maximum sugar content or the complete ripening thereof. The application is carried out at more than about one week prior to harvest but not more than 4 months prior to harvest. Application not more than about 2 months prior to harvest is particularly advantageous.

The compound is applied to the maturing sugarcane in an amount sufficient to increase the sugar content of the sugarcane, but in an amount insufficient to exert a herbicidal action to the cane. Such amounts are determined by and dependent upon the method of application, the stage of growth and the climatic conditions. An increase in sugar content of the sugarcane without herbicidal action is obtained in most instances by the application of the compound in an amount from about 0.1 to about 10 pounds per acre. The preferred application rate is from about 3 pounds to about 7 pounds of the compound per acre.

The compound of this invention is prepared according to the procedure of Example 1.

EXAMPLE 1

(a) Preparation of p-nitrobenzenesulfonylurea

To a suitable vessel, equipped with stirring means and reflux apparatus, was charged 121 parts by weight p-nitrobenzenesulfonamide, 49 parts by weight potassium cyanate, 744 parts by weight ethanol and 240 parts by weight water. The mixture was refluxed for 13 hours and then cooled slowly to room temperature. The resultant solid, potassium salt of p-nitrobenzenesulfonylisourea, was filtered off, washed with acetone and dried.

Forty parts by weight of the potassium salt of p-nitrobenzenesulfonylisourea was dissolved in 650 parts by weight warm water and acidified with hydrochloric acid. The solid p-nitrobenzenesulfonylurea was filtered off, washed with water and dried. An 82% yield was obtained melting at 195–197° C.

(b) Preparation of isopropylidineaminoethanol salt of p-nitrobenzenesulfonylisourea To a suitable vessel, equipped with a stirring means, was charged 36 parts by weight acetone and 4.5 parts by weight p-nitrobenzenesulfonylurea. To the resultant mixture was added 1.2 parts by weight ethanolamine and the mixture stirred at about 25° C. for 4 hours. The solid product was filtered off and dried. A yield of 89% was obtained having a melting point of 130–131° C.

The use of isopropylidineaminoethanol salt of p-nitrobenzenesulfonylisourea to increase the sugar content of sugarcane is illustrated by the following example.

EXAMPLE 2

Six month old sugarcane (Pinder) plants grown under greenhouse conditions at a temperature from about 70° F. to about 90° F. and 65% relative humidity are sprayed with aqueous solutions containing a small amount of emulsified and various amounts of isopropylidineaminoethanol salt of p-nitrobenzenesulfonylisourea at a rate equivalent to about 70 gallons of spray per acre. The sprays are applied at rates of one, four and eight pounds of the compound per acre using Randomized Block with six replication of each application rate including control (no active ingredient). Harvesting is carried out four weeks after spraying and the amount of sucrose is measured and recorded. Results and further details are given in the table wherein results are expressed as a percent of the control.

| Application rate, lb./acre: | Total weight of sucrose per stalk |
|---|---|
| Control— | |
| 0 | 100 |
| 1 | 128 |
| 4 | 136 |
| 8 | 171 |

The increase in sugar content exhibited in the above table was brought about without herbicidal action on the sugarcane.

In practicing the methods of this invention, the active compound can be used alone or in combination with an adjuvant in liquid or solid form. The compositions are prepared by admixing the active compound with an adjuvant including diluents, extenders, spreaders, adhesives, carriers and conditioning agents to provide compositions in the form of finely-divided particulate solids, solutions, dispersions or emulsions. Thus the active compound can be used with an adjuvant such as finely-divided particulate solid, a liquid of organic, water, a wetting agent, dispersing agent, an emulsifying agent or any suitable combination of these.

Typical finely-divided solid carriers and extenders which can be used in the compositions of this invention include, for example, the talcs, clays, pumice, silica, lime, calcium carbonate, diatomaceous earth, quartz, fuller's earth, salt, sulfur, powdered cork, powdered wood, cotton seed hulls, wheat flour, soybean flour, walnut flour, chalk, tobacco dust, volcanic ash, charcoals and the like. Typical liquid diluents include for example, water, kerosene, Stoddard solvent, hexane, benzene, toluene, acetone, ethylene dichloride xylene, alcohols, diesel oil, glycols and the like.

The compositions useful in this invention, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

Preferred compositions containing the active compound have been developed so that the compound can be used to the greatest advantage to increase the sugar content of sugarcane. The preferred compositions comprise certain wettable powders, aqueous suspensions, dust formulations, emulsifiable oils and solutions in solvents. In general these preferred compositions all contain one or more surface-active agents.

Surface-active agents which can be used in the compositions useful in this invention are set out, for example, in Searle U.S. Pat. 2,426,417, Todd U.S. Pat. 2,655,447, Jones U.S. Pat. 2,412,510 and Lenher U.S. Pat. 2,139,276. A detailed list of such agents is also set forth by J. W. McCutcheon in "Soap and Chemical Specialties," November 1947, p. 8011 et seq., entitled "Synthetic Detergents"; "Detergents and Emulsifiers—Up to Date" (1960), by J. W. McCutcheon, Inc., and Bulletin E-607 of the Bureau of Enthomology and Plant Quarantine of the U.S.D.A. In general, less than 50 parts by weight of the surface-active agent is present per 100 parts by weight of the composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkali metal alkylaryl sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils, ditertiary acetylenic glycols, polyoxyethylene derivatives of alkylphenols (particularly isooctylphenol and nonylphenol) and polyoxyethylene derivatives of mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl - N - (long chain acid) taurates.

The wettable powder compositions usually contain from about 5 to about 95 parts of the compound, from about 0.25 part to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both. The solution formed by admixture of the compound with water or other aqueous media can also be employed in the methods of this invention without further formulation.

When operating in accordance with the present invention, effective amounts of the compound are applied to sugarcane plants in any convenient fashion. The application of the compositions to the sugarcane can be carried out by conventional methods, e.g., power dusters, boom and hand sprayers and spray dusters. The compositions can also be applied from airplanes as a dust or a spray because of their effectiveness at low dosages.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claim appended hereto be limited to the examples and description set forth herein but rather the claim be construed as encompassing all the features of patentable novelty which reside in the present invention including all features which would be treated as equivalents thereof by those skilled in the art to which the invention pertains.

What is claimed is:

1. A method of increasing the sugar content of sugarcane which comprises applying to sugarcane isopropylidineaminoethanol salt of p-nitrobenzenesulfonylisourea in an amount sufficient to increase the sugar content of the sugarcane but in an amount insufficient to exert a herbicidal action to the cane.

References Cited

FOREIGN PATENTS 295,363  4/1965  Netherlands _____ 71—103

JAMES O. THOMAS, Jr., Primary Examiner

U.S. Cl. X.R.

260—397.7